(12) United States Patent
Kurihara et al.

(10) Patent No.: US 11,401,922 B2
(45) Date of Patent: Aug. 2, 2022

(54) DISPLACEMENT CONTROL VALVE

(71) Applicant: EAGLE INDUSTRY CO., LTD., Tokyo (JP)

(72) Inventors: Daichi Kurihara, Tokyo (JP); Kohei Fukudome, Tokyo (JP); Masahiro Hayama, Tokyo (JP); Keigo Shirafuji, Tokyo (JP)

(73) Assignee: EAGLE INDUSTRY CO., LTD.

( * ) Notice: Subject to any disclaimer, the term of this patent is extended or adjusted under 35 U.S.C. 154(b) by 254 days.

(21) Appl. No.: 16/498,329

(22) PCT Filed: Mar. 20, 2018

(86) PCT No.: PCT/JP2018/011063
§ 371 (c)(1),
(2) Date: Sep. 26, 2019

(87) PCT Pub. No.: WO2018/180784
PCT Pub. Date: Oct. 4, 2018

(65) Prior Publication Data
US 2021/0102532 A1   Apr. 8, 2021

(30) Foreign Application Priority Data

Mar. 28, 2017 (JP) ............................ JP2017-062552
Apr. 26, 2017 (JP) ............................ JP2017-086958

(51) Int. Cl.
*F04B 27/18* (2006.01)
*F04B 49/22* (2006.01)
(Continued)

(52) U.S. Cl.
CPC .......... *F04B 27/1804* (2013.01); *F16K 31/06* (2013.01); *F04B 49/22* (2013.01);
(Continued)

(58) Field of Classification Search
CPC .... F04B 27/18–2027/1895; F16K 1/42; F16K 31/06
See application file for complete search history.

(56) References Cited

U.S. PATENT DOCUMENTS 3,737,141 A   6/1973  Zeuner ................ F16L 31/0655
5,915,416 A   6/1999  Okazaki et al. ......... 137/596.17
(Continued)

FOREIGN PATENT DOCUMENTS

CN   100396916   6/2008   ............. F04B 27/08
CN   101410620   4/2009   ............. F04B 27/14
(Continued)

OTHER PUBLICATIONS

EP Search Report issued in corresponding application No. 18777278.5, dated Aug. 4, 2020 (9 pgs).
(Continued)

*Primary Examiner* — Philip E Stimpert
(74) *Attorney, Agent, or Firm* — Hayes Soloway P.C.

(57) ABSTRACT

A displacement control valve includes a housing a first, a second, and a third chamber; a valve body having a first reciprocating valve part that opens or closes discharge paths in the first chamber; and a solenoid that applies electromagnetic force to the valve body in the direction that closes the first valve part. The control valve has a spool valve part formed on the external circumference of the valve body and a spool seating part formed on the internal circumference of the valve housing and that is opened while the first valve part is closed and vice versa upon reciprocation of the valve body to control the rate of flow between a control chamber and an inlet chamber.

19 Claims, 11 Drawing Sheets

(51) Int. Cl.
*F16K 31/06* (2006.01)
*F16K 1/42* (2006.01)

(52) U.S. Cl.
CPC ............... *F04B 2027/1813* (2013.01); *F04B 2027/1827* (2013.01); *F04B 2027/1854* (2013.01); *F16K 1/42* (2013.01)

(56) References Cited

U.S. PATENT DOCUMENTS

| | | | |
|---|---|---|---|
| 6,354,811 B1 | 3/2002 | Ota et al. | 417/222.2 |
| 6,358,017 B1* | 3/2002 | Ota | F04B 27/1804 |
| | | | 417/222.2 |
| 6,435,848 B1 | 8/2002 | Minami et al. | 417/440 |
| 6,443,707 B1 | 9/2002 | Kimura et al. | 417/222.2 |
| 6,481,976 B2 | 11/2002 | Kimura | F04B 27/1804 |
| 6,772,990 B2 | 8/2004 | Sasaki et al. | 251/129.03 |
| 7,871,056 B2 | 1/2011 | Kratzer | B60T 8/3675 |
| 8,079,827 B2 | 12/2011 | Iwa et al. | 417/222.2 |
| 8,251,673 B2 | 8/2012 | Taguchi | 417/222.2 |
| 8,282,072 B2 | 10/2012 | Kratzer | F16K 31/0665 |
| 8,651,826 B2 | 2/2014 | Futakuchi | F04B 27/1804 |
| 9,132,714 B2 | 9/2015 | Futakuchi | F04B 27/1804 |
| 9,410,514 B2 | 8/2016 | Watanabe | F04B 49/08 |
| 9,599,249 B2 | 3/2017 | Holmes | F16K 31/0693 |
| 2001/0003573 A1 | 6/2001 | Kimura et al. | 417/222.2 |
| 2004/0057840 A1 | 3/2004 | Hirota | 417/222.2 |
| 2004/0191078 A1 | 9/2004 | Yoshihiro et al. | 417/222.2 |
| 2005/0211939 A1* | 9/2005 | Morisawa | F16K 31/0634 |
| | | | 251/129.15 |
| 2005/0254961 A1 | 11/2005 | Kawamura et al. | F04B 1/26 |
| 2008/0138213 A1 | 6/2008 | Umemura et al. | 417/222.2 |
| 2009/0183786 A1 | 7/2009 | Iwa et al. | 137/487.5 |
| 2010/0068074 A1* | 3/2010 | Shimada | F04B 27/1804 |
| | | | 417/222.1 |
| 2011/0091334 A1 | 4/2011 | Taguchi et al. | 417/222.1 |
| 2012/0198992 A1 | 8/2012 | Futakuchi et al. | 91/505 |
| 2012/0198993 A1 | 8/2012 | Fukudome et al. | 91/505 |
| 2013/0291963 A1 | 11/2013 | Futakuchi et al. | 137/487.5 |
| 2014/0248163 A1 | 9/2014 | Lee et al. | F04B 27/1804 |
| 2018/0003313 A1 | 1/2018 | Schnelker et al. | F16K 31/06 |

FOREIGN PATENT DOCUMENTS

| | | | |
|---|---|---|---|
| CN | 103671102 | 3/2014 | F04C 14/22 |
| CN | 106090266 | 11/2016 | F16K 1/36 |
| EP | 1099852 | 5/2001 | F04B 27/18 |
| EP | 1279831 | 1/2003 | F04B 27/18 |
| EP | 1333177 | 8/2003 | F04B 27/18 |
| EP | 1462650 | 9/2004 | F04B 27/18 |
| EP | 1479908 | 11/2004 | F04B 27/18 |
| EP | 1582742 | 10/2005 | F04B 27/18 |
| EP | 1852606 | 11/2007 | F04B 27/18 |
| EP | 1895162 | 3/2008 | F04B 27/14 |
| EP | 1995460 | 11/2008 | F04B 27/14 |
| EP | 2090779 | 8/2009 | F04B 27/14 |
| EP | 2857681 | 4/2015 | F04B 27/14 |
| JP | S5531029 | 2/1980 | F16K 31/06 |
| JP | H058152 | 2/1993 | F16K 31/06 |
| JP | H116578 | 1/1999 | F16K 11/056 |
| JP | H1162825 | 3/1999 | F04B 27/14 |
| JP | 2001132632 | 5/2001 | F04B 27/14 |
| JP | 201165055 | 6/2001 | F04B 27/14 |
| JP | 2004116349 | 4/2004 | B60H 1/32 |
| JP | 2004-156575 | 6/2004 | F04B 27/14 |
| JP | 2004293497 | 10/2004 | F04B 27/14 |
| JP | 2005120972 | 5/2005 | F04B 27/14 |
| JP | 2007064028 | 3/2007 | F04B 27/14 |
| JP | 2010031786 | 2/2012 | |
| JP | 5167121 | 3/2013 | F04B 27/14 |
| WO | WO2006090760 | 8/2006 | F04B 27/18 |
| WO | WO2007119380 | 10/2007 | F04B 27/14 |
| WO | WO2011114841 | 9/2011 | F04B 27/14 |
| WO | WO2012077439 | 6/2012 | F04B 27/14 |

OTHER PUBLICATIONS

Korean Office Action issued in corresponding application No. 10-2019-7029287, with translation, dated Aug. 24, 2020 (10 pgs).
Chinese Office Action issued in corresponding application No. 201880021361.0, with translation, dated Jul. 24, 2020 (13 pgs).
European Official Action issued in corresponding application No. 18777278.5 dated Apr. 1, 2021 (7 pgs).
European Official Action issued in corresponding application No. 18850175.3 dated Apr. 13, 2021 (10 pgs).
International Preliminary Report on Patentability (w/translations) issued in application No. PCT/JP2018/031555, dated Mar. 3, 2020 (5 pgs).
Office Action issued in Korean patent application No. 10-2020-7004169, with English translation, dated Nov. 19, 2020, 11 pgs.
International Search Report and Written Opinion (w/translations) issued in application No. PCT/JP2018/031555, dated Nov. 27, 2018 (15 pgs).
PCT Notification of Transmittal of Translation of the International Preliminary Report on Patentability for application No. PCT/JP2011/053810, dated Nov. 1, 2012 (6 pgs).
International Search Report for corresponding appln. No. PCT/JP2011/053810, dated May 24, 2011 (1 pg).
International Preliminary Report on Patentability issued in application No. PCT/JP2014/051901, dated Aug. 13, 2015 (7 pgs).
International Search Report issued in application No. PCT/JP2014/051901, dated Apr. 18, 2014 (4 pgs).
Chinese Office Action issued in corresponding application No. 201880050845.8, with translation, dated May 8, 2021 (10 pgs).
European Office Action issued in corresponding application No. 18 777 278.5, dated Aug. 10, 2021 (8 pgs).
U.S. Appl. No. 16/635,488, filed Jan. 30, 2020.
U.S. Appl. No. 13/500,302, filed Feb. 22, 2011.
U.S. Appl. No. 14/431,270, filed Jan. 29, 2014.
Official Action issued in corresponding U.S. Appl. No. 16/635,488, dated Feb. 14, 2022 (9 pgs).
International Preliminary Report on Patentability (w/translation) issued in application No. PCT/JP2018/011063, dated Oct. 1, 2019 (11 pgs).
International Search Report and Written Opinion (w/translation) issued in application No. PCT/JP2018/011063, dated Jun. 26, 2018 (14 pgs).

* cited by examiner

DISPLACEMENT CONTROL VALVE

TECHNICAL FIELD

The present invention relates to a displacement control valve that variably controls the volume or pressure of working fluid and, in particular, relates to a displacement control valve that controls the volume of discharged fluid in a variable displacement compressor used in an air conditioning system for automobiles and the like.

BACKGROUND ART

Conventional variable displacement compressors used in an air conditioning system for automobiles and the like include a rotatable shaft that is rotationally driven by an engine, a swashplate that is connected to the rotatable shaft so that the slope angle with respect to the rotatable shaft is variable, a compression piston that is connected to the swashplate, and the like. The compressors control the volume of discharged fluid by varying the slope angle of the swashplate to vary the piston stroke. The slope angle of the swashplate is configured to be continuously changed by utilizing the suction pressure Ps in an inlet chamber that sucks fluid, the discharge pressure Pd in a discharge chamber that discharges the fluid pressurized by pistons, and the control pressure Pc in a control chamber that houses the swashplate, while using a displacement control valve that is electromagnetically opened or closed in order to appropriately control the pressure in the control chamber.

When such variable displacement compressors are stopped and remain inactive for a long period of time, the suction pressure Ps, the discharge pressure Pd, and the control pressure Pc in the variable displacement compressors are equalized, and then the control pressure Pc and the suction pressure Ps are significantly higher than those during the continuous operation of the variable displacement compressors (hereinafter sometimes simply referred to "during the continuous operation"). Thus, it requires a time to reduce the control pressure Pc, and thus it takes a longer time to control the volume of the discharged fluid to a target value.

In view of the foregoing, a displacement control valve is provided, the valve allowing the fluid to be quickly discharged from the control chamber in the variable displacement compressors upon activation of the variable displacement compressors.

As illustrated in FIG. 11, a displacement control valve 100 described in Patent Literature 1 includes a valve housing 110 including a first valve chamber 120 that are formed between discharge paths 112a and 112b for allowing the discharge chamber to communicate with the control chamber, a second valve chamber 130 that is formed between inlet paths 113a and 113b for allowing the inlet chamber to communicate with the control chamber, and a third valve chamber 140 that is opposed to the second valve chamber 130 across the first valve chamber 120; a valve body 150 that integrally has a first valve part 152 for opening or closing the discharge paths 112a and 112b in the first valve chamber 120 and a second valve part 153 for opening or closing the inlet paths 113a and 113b in the second valve chamber 130 and that opens the the discharge paths while the inlet paths is closed and vice versa upon reciprocation of the element 150; an intermediate communication path 155 (second communication path) that allows the second valve chamber 130 to communicate with the third valve chamber 140 and that is formed in the valve body 150; a pressure sensitive member 160 that is disposed in the third valve chamber 140, that expands to press the first valve part 152 in the direction that opens the first valve part 152, and that contracts in response to an increase in ambient pressure; an adapter 170 that is disposed at a free end in the direction of expansion and contraction of the pressure sensitive member 160 and that has an annular seating-surface; a third valve part 154 that moves integrally with the valve body 150 in the third valve chamber 140 and that has an engagement surface that can be engaged with and disengaged from the adapter 170 to open and close the inlet paths 113a and 113b; a solenoid 180 that provides electromagnetic force to operate the valve body 150; and an auxiliary communication path 190 that is formed in the adapter 170 to allow the third valve chamber 140 to communicate with the intermediate communication path 155.

Upon activation of the variable displacement compressor, the solenoid 180 of the displacement control valve 100 is energized, and then the valve body 150 is moved, so that the first valve part 152 moves in the direction that closes the discharge paths, while the second valve part 153 moves in the direction that opens the inlet paths. Then, the third valve chamber 140 is allowed to communicate with the second valve chamber 130 via the auxiliary communication path 190 and the intermediate communication path 155, and thus the inlet paths 113a and 113b are opened (as illustrated in FIG. 11). This causes fluid at high pressure in the control chamber of the variable displacement compressor to be discharged through the auxiliary communication path 190 and the intermediate communication path 155 into the inlet chamber. The pressure sensitive member 160 contracts in respond to the control pressure Pc, so that the third valve part 154 is disengaged from the adapter 170 and is opened. Then the flow path to the intermediate communication path 155 is expanded, so that the fluid is caused to be discharged from the control chamber into the inlet chamber, allowing the control pressure Pc to be reduced more quickly. When the control pressure Pc is reduced to the pressure exhibited during the continuous operation, the pressure sensitive member 160 elastically returns and expands, and the third valve part 154 is engaged with the adapter 170 and is closed.

CITATION LIST

Patent Literature

Patent Citation 1: JP 5167121B (Page 12, FIG. 2)

SUMMARY OF INVENTION

Technical Problem

In Patent Literature 1, the flow rate of discharged fluid in the variable displacement compressor is controlled to a target value during the continuous operation by controlling the drive current of the solenoid 180 to move the first valve part 152 in the axial direction, so that the opening area between the first valve part 152 and the seating surface is changed to control the flow rate in the discharge paths 112a and 112b. In this case, when the second valve part 153 and the seating surface are separated, the inlet paths 113a and 113b communicate with the control chamber via the auxiliary communication path 190, so that fluid such as, for example, a refrigerant flows from the control chamber into the inlet chamber. Thus, even during the continuous operation, a relatively large volume of the fluid flows into the inlet chamber via the auxiliary communication path 190, which increases the pressure in the inlet chamber and thus decreases the operational efficiency of the variable displacement compressors.

The present invention has been developed in view of such problem, and an object of the present invention is to provide a displacement control valve that can reduce the flow of unwanted fluid into the inlet chamber during the continuous operation.

Solution to Problem

To solve the problem, a displacement control valve according to a first aspect of the present invention includes:
a valve housing including a first chamber formed between discharge paths that allow a discharge chamber for discharging fluid to communicate with a control chamber for controlling the volume of the discharged fluid, a second chamber formed between inlet paths that allow an inlet chamber for sucking the fluid to communicate with the control chamber, and a third chamber opposed to the second chamber across the first chamber;
a valve body that has a first valve part for opening or closing the discharge paths in the first chamber and that is reciprocated to open or close the discharge paths; and
a solenoid that applies electromagnetic force to the valve body in the direction that closes the first valve part,
wherein the displacement control valve is characterized by having a spool valve structure that is constituted by a spool valve part formed on the external circumference of the valve body and a spool seating part formed on the internal circumference of the valve housing and that is opened while the first valve part is closed and vice versa upon reciprocation of the valve body to control the rate of flow between the control chamber and the inlet chamber.

According to the first aspect, movement of the valve body allows for the opening area of the spool valve structure to be opened while the opening area of the first valve part is closed and vice versa, and thus the rate of flow between the discharge chamber and the control chamber and the rate of flow between the inlet chamber and the control chamber are simultaneously controlled, so that the rate of flow from the control chamber into the inlet chamber is limited during the continuous operation of the variable displacement compressor, and the operational efficiency of the variable displacement compressor can be improved. The spool valve structure between the inlet chamber and the control chamber allows for precise control of the flow rate.

The displacement control valve according to a second aspect of the present invention is characterized in that the spool seating part is constituted by a step formed on the internal circumference of the valve housing by a larger diameter part, a smaller diameter part and a radially extending part connecting the larger diameter part to the smaller diameter part, and that the spool valve part is constituted by a step formed on the external circumference of the valve body by a smaller diameter part, a larger diameter part and a radially extending part connecting the larger diameter part to the smaller diameter part.

According to the second aspect, the spool valve structure can have a simple structure.

The displacement control valve according to a third aspect of the present invention is characterized in that the radially extending part of the spool valve part is perpendicular to the smaller diameter part and the larger diameter part of the spool valve part.

According to the third aspect, even when the travel length of the valve body is short, the flow in the spool valve structure can be provided, so that the flow rate can be controlled quickly.

The displacement control valve according to a fourth aspect of the present invention is characterized in that the radially extending part of the spool seating part is perpendicular to the smaller diameter part and the larger diameter part of the spool seating part.

According to the fourth aspect, even when the travel length of the valve body is short, the flow in the spool valve structure can be provided, so that the flow rate can be controlled quickly.

The displacement control valve according to a fifth aspect of the present invention is characterized in that the smaller diameter part of the spool seating part and the larger diameter part of the spool valve part are configured to be radially overlapped with each other when the solenoid is not energized.

According to the fifth aspect, even if the travel length of the valve body is slightly changed due to aging and the like, the spool valve structure can reliably provide the closed state when the solenoid is not energized. According to the fifth aspect, when the spool valve structure is in its closed state, the structure is not fully closed and allows the fluid to leak.

The displacement control valve according to a sixth aspect of the present invention is characterized in that the spool valve structure forms a throttle between the control chamber and the inlet chamber when the solenoid is not energized.

According to the sixth aspect, the control chamber has the substantially same pressure as the inlet chamber when the displacement control valve is not used, and thus the valve body can be smoothly moved when the solenoid begins to be energized.

The displacement control valve according to a seventh aspect of the present invention is characterized in that a fourth chamber in which the spool valve structure is disposed is provided between the first chamber and the second chamber.

According to the seventh aspect, the displacement control valve can have a simple structure.

The displacement control valve according to an eighth aspect of the present invention is characterized in that the valve housing includes a through hole for allowing the third chamber to communicate with the control chamber and a through hole for allowing the fourth chamber to communicate with the control chamber and that the third chamber are separated from the fourth chamber.

According to the eighth aspect, the displacement control valve can have an external path that allows the third chamber and the fourth chamber to communicate with the control chamber of a variable displacement compressor, and thus the valve can have a large flow area and easily permit the fluid to be discharged.

The displacement control valve according to a ninth aspect of the present invention is characterized in that the valve housing includes a through hole for allowing the third chamber to communicate with the control chamber and a through hole for allowing the fourth chamber to communicate with the third chamber in the valve housing.

According to the ninth aspect, the valve housing includes the small number of through holes that communicate with the interior and exterior of the valve housing, and thus the valve housing can be configured to have a shorter axial length, and the valve housing 10 can easily maintain coaxiality with the valve body and the spool valve part.

BRIEF DESCRIPTION OF DRAWINGS

FIG. 3(a) is an enlarged cross-sectional view in a closed state in which the valve is not energized, FIG. 3(b) is an enlarged cross-sectional view at an opening point in which the valve is not energized, and FIG. 3(c) is an enlarged cross-sectional view in a state in which the coil is energized and in which the opening area is largest.

FIG. 8 are an enlarged cross-sectional view of a spool valve structure of a displacement control valve according to an Embodiment 4 of the present invention.

DESCRIPTION OF EMBODIMENTS

Now, embodiments of the displacement control valve according to the present invention will be described with reference to embodiments.

Embodiment 1

A displacement control valve in the Embodiment 1 will be described with reference to FIGS. 1-5. For convenience of description, the control pressure Pc is designated as different symbols: a control pressure Pc1 and a control pressure Pc2 in FIG. 2, FIG. 3, and FIG. 5.

Figure 1:
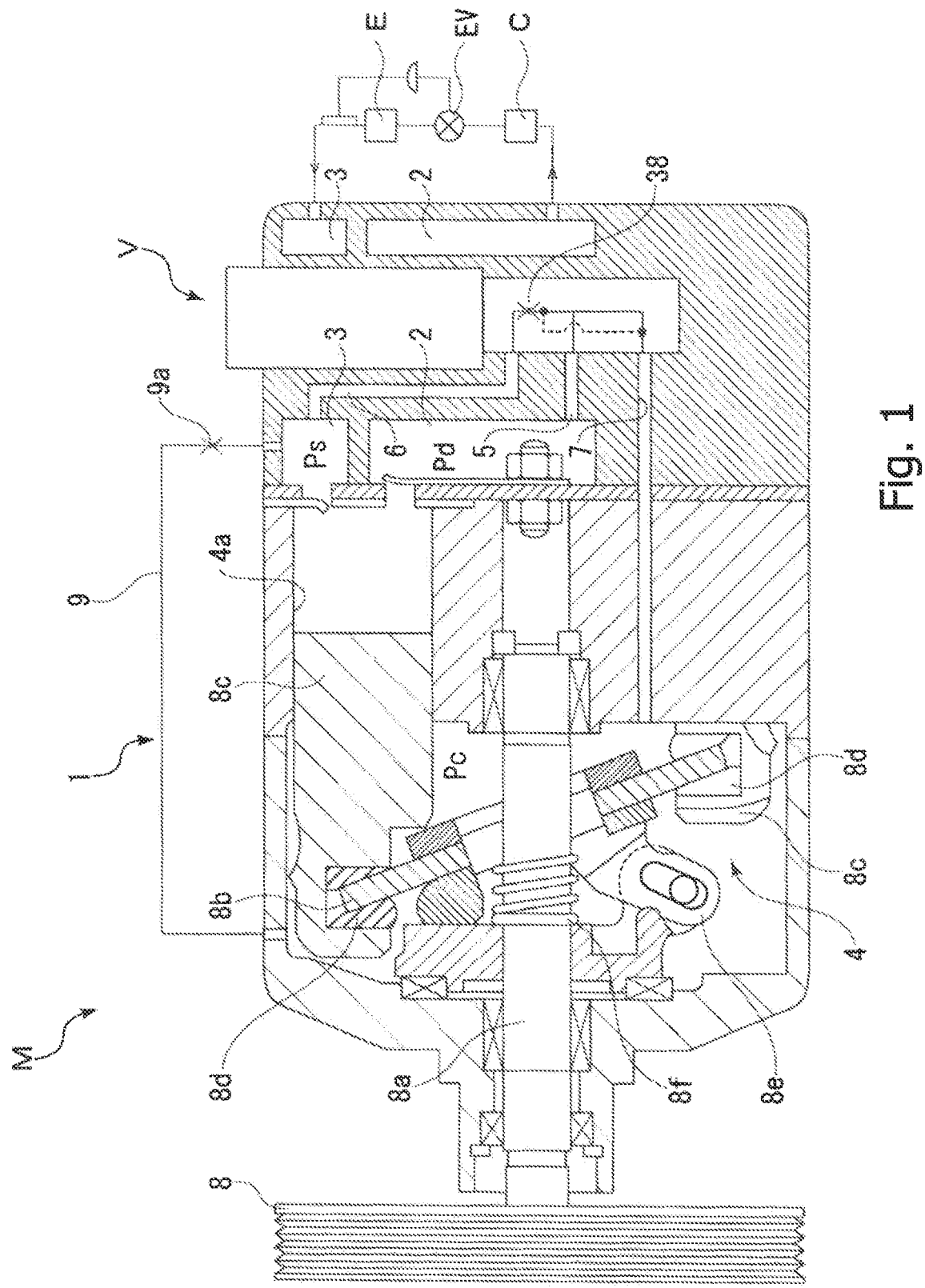
FIG. 1 is a schematic diagram of a swashplate type variable displacement compressor with a displacement control valve according to an Embodiment 1 of the present invention.

As illustrated in FIG. 1, a variable displacement compressor M includes a discharge chamber 2, an inlet chamber 3, a control chamber 4, and a plurality of cylinders 4a and has a casing 1 that houses a communication path 5 as a discharge path that allows the discharge chamber 2 to communicate with the control chamber 4, a communication path 6 as an inlet paths that allows the inlet chamber 3 to communicate with control chamber 4, and a communication path 7 that combines the functions of a discharge path and an inlet path. The casing 1 incorporates a displacement control valve V.

The discharge chamber 2 and the inlet chamber 3 of the variable displacement compressor M are connected to an external freezing/cooling line. As used herein, the freezing/cooling line includes a condenser C, an expansion valve EV, and an evaporator E that are serially arranged and constitutes the main part of an air conditioning system.

The variable displacement compressor M also includes a communication path 9 that allows the control chamber 4 to directly communicate with the inlet chamber 3, and the communication path 9 includes a fixed orifice 9a that controls the pressure in the inlet chamber 3 and the control chamber 4 by the balance.

The variable displacement compressor M also includes a driven pulley 8 that is connected to a V-belt (not shown) outside the casing 1, a rotatable shaft 8a that extends from inside the control chamber 4 to outside the casing 1 and that is fixed to the driven pulley 8, a swashplate 8b that is eccentrically connected to the rotatable shaft 8a via a hinge mechanism 8e, a plurality of pistons 8c that are reciprocatably engaged in respective cylinders 4a, a plurality of connectors 8d that connect the swashplate 8b and the respective pistons 8c, and a spring 8f that is inserted into the rotatable shaft 8a.

The swashplate 8b varies its slope angle in response to control pressure Pc. This is attributed to the fact that although a force is always applied to the swashplate 8b by the spring 8f and the hinge mechanism 8e, the plurality of pistons 8c vary their stroke width in response to the control pressure Pc, so that the slope angle of the swashplate 8b is limited by the stroke width of the plurality of pistons 8c. Thus, a higher control pressure Pc provides a smaller slope angle of the swashplate 8b, although when the pressure Pc reaches a certain level or higher, the hinge mechanism 8e limits the slope angle, so that the swashplate 8b becomes substantially perpendicular to the rotatable shaft 8a (slightly inclined from the perpendicular). A lower control pressure Pc provides a larger slope angle of the swashplate 8b, although when the pressure Pc reaches a certain level or lower, the hinge mechanism 8e limits the slope angle, so that the swashplate 8b has the largest slope angle.

When the swashplate 8b is substantially perpendicular to the rotatable shaft 8a, the pistons 8c have the smallest stroke, the cylinders 4a and the pistons 8c apply the lowest pressure to the fluid, and the air conditioning system has the lowest cooling capacity. When the swashplate 8b has the largest slope angle, the pistons 8c have the largest stroke, the cylinders 4a and the pistons 8c apply the highest pressure to the fluid, and the air conditioning system has the largest cooling capacity.

The variable displacement compressor M controls the volume of discharged fluid as a refrigerant by controlling the electromagnetic force applied to the displacement control valve V by, for example, controlling the duty cycle to control the control pressure Pc in the control chamber 4. Specifically, the control pressure Pc is controlled by controlling the current applied to a coil 87 in the displacement control valve V to control the level of the opening of a first valve part 52, a second valve part 53, a spool valve structure SP, and the like as described below and then to control the rate of flow into or from the control chamber 4. Such control allows the plurality of pistons Sc in the variable displacement compressor M to vary its stroke.

Figure 2:
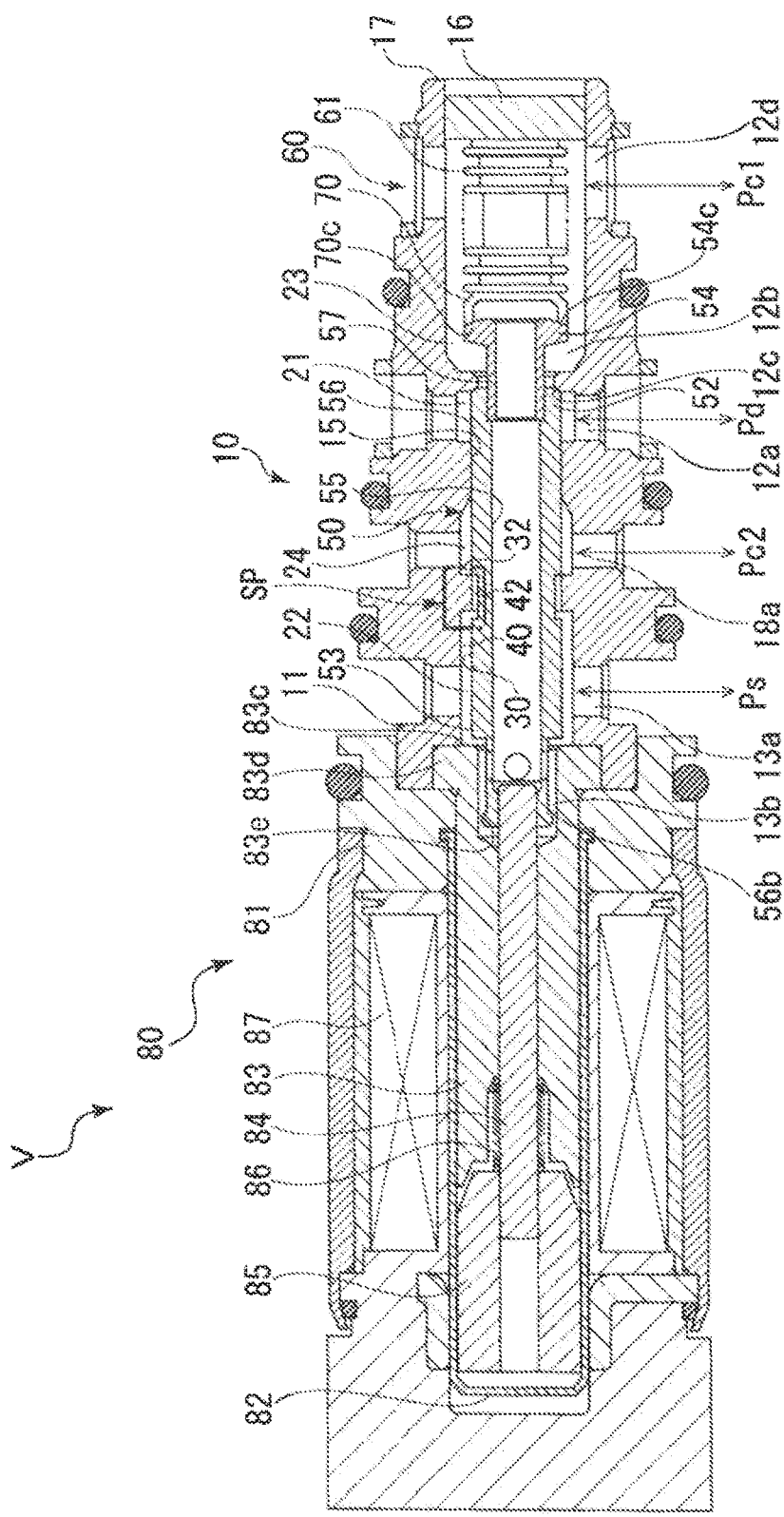
FIG. 2 is a cross-sectional view of the displacement control valve of the Embodiment 1, in which a solenoid is energized.

As illustrated in FIG. 2, the displacement control valve V includes a valve housing 10 that is formed of a metal or resin material, a valve body 50 that is reciprocatably disposed in the valve housing 10, a pressure sensitive member 60 that presses the valve body 50 in a single direction (the direction toward a solenoid 80), the solenoid 80 that is connected to the valve housing 10 to provide electromagnetic force for operation of the valve body 50, and the like.

For convenience of description, FIG. 2 illustrates a cross-sectional view of the displacement control valve V, taken by two planes perpendicular to each other along the central axis of the valve.

The solenoid 80 include a casing 81 that is connected to the valve housing 10, a sleeve 82 with one end closed, a fixed cylindrical iron core 83 that is disposed inside of the casing 81 and the sleeve 82, a drive rod 84 that is reciprocatable within the fixed iron core 83 and that has an end connected to the valve body 50, a movable iron core 85 that is fixed to the other end of the drive rod 84, a coil spring 86 that presses the movable iron core 85 in the direction that opens a first valve part 52, a coil 87 for excitation that is wound around a bobbin that surrounds the sleeve 82, and the like.

The fixed iron core 83 is formed of a rigid magnetic material such as iron or silicon steel. At one end of the fixed iron core 83, an annular flange 83d extends radially outwardly and is fit into an opening 11, as described below, of the valve housing 10 to be fixed in a liquid tight manner.

The valve housing 10, which is substantially cylindrically shaped, has, at one end, an opening 11 with a U-shaped cross section, into which the solenoid 80 is fit; at the other end, an opening 17 into which a partition adjuster 16 is fit; and, on the internal circumference, a small diameter guide surface 15 against which the valve body 50 is slidably fit.

The partition adjuster 16 constitutes a part of the valve housing 10 and defines a third valve chamber 23. Adjustment of the position of the partition adjuster 16 that is fit into the opening 17 allows for control of the sensitivity of the pressure sensitive member 60.

The valve housing 10 also includes communication paths 12a (through hole), 12b, and 12d (through hole) that function as discharge paths, communication paths 13a and 13b that function as inlet paths in conjunction with a second communication path 55 of the valve body 50, a communication path 18a (through hole) that functions as an inlet path in conjunction with the communication path 13a, a first valve chamber 21 (first chamber) that is formed between the discharge paths, a second valve chamber 22 (second chamber) that is formed between the inlet paths, a third valve chamber 23 (third chamber), and a fourth valve chamber 24 (fourth chamber) that is formed between the first valve chamber 21 and the second valve chamber 22. In particular, the third valve chamber 23 is formed to concurrently function as part of the discharge paths and part of the inlet paths, while the fourth valve chamber 24 is part of the inlet paths. Particularly, the communication path 13b is formed by the valve housing 10, the flange 83d of the fixed iron core 83, and a concave 83e.

The valve body 50 is formed by a main valve body 56 and an auxiliary valve body 57 and includes a first valve part 52 that is disposed at one end of the main valve body 56, a second valve part 53 that is disposed at the other end of the main valve body 56, a third valve part 54 that is subsequently disposed in the auxiliary valve body 57 connected to the main valve body 56 so that the third valve part 54 is opposed to the second valve part 53 across the first valve part 52, a fourth valve member 32 (also referred to as spool valve part 32) that is disposed on an external circumference 30 of the main valve body 56, and the like. As the auxiliary valve body 57 is connected to the main valve body 56, the auxiliary valve body 57 integrally moves with the main valve body 56.

The valve body 50 has a substantially cylindrical shape and includes a second communication path 55 that penetrates, along the axis, from the second valve part 53 to the third valve part 54 and that functions as an inlet path. The valve members engage with a seating surface or a seat to constitute a valve.

The valve body 50 can close the communication paths 12a and 12b by engaging the first valve part 52 with a first seating surface 12c formed on an edge of the communication path 12a of the first valve chamber 21 and can close the communication paths 13a and 13b by engaging the second valve part 53 with a second seating surface 83c formed at an end of the fixed iron core 83 in the second valve chamber 22. As detailed below, the rate of flow between the communication paths 13a and 18a can be varied by engaging the spool valve part 32 with a spool seating part 42 disposed on the internal circumference 40 of the valve housing 10.

The main valve body 56 includes a neck 56b that extends from the second valve part 53 in the direction toward the solenoid 80, that has a diameter smaller than that of the second valve part 53, and that is inserted into the concave 83e.

The auxiliary valve body 57, which is substantially cylindrically shaped, includes a third valve part 54 that widens toward the pressure sensitive member 60, that is inserted into the communication path 12b, and that has an outer peripheral edge engaged with the adapter 70.

The pressure sensitive member 60 includes a bellows 61, an adapter 70, and the like. One end of the bellows 61 is fixed to the partition adjuster 16, and the other end retains the adapter 70. The adapter 70 includes, at one end, an annular third seating surface 70c that is engaged with and disengaged from an engagement surface 54c of the third valve part 54 and that has a substantially U-shaped cross section.

The pressure sensitive member 60, which is disposed in the third valve chamber 23, elongates (expands) to press the first valve part 52 in the direction that opens the discharge paths and contracts in response to an increase in pressure in the third valve chamber 23 to disengage the third seating surface 70c of the adapter 70 from the engagement surface 54c of the third valve part 54.

Now, the spool valve structure SP will be described with reference to FIG. 3. The external circumference 30 of the main valve body 56 includes an annular concave groove 31 that is recessed toward the inside, while the internal circumference 40 of the valve housing 10 includes an annular land 41 that protrudes toward the inside. The concave groove 31 and the land 41 are disposed so that the groove 31 and the land 41 are partially or fully overlapped, as viewed radially.

In particular, the concave groove 31 is defined by a radially extending surface 34 (radially extending part) that perpendicularly extends from a larger diameter surface 33 (larger diameter part), which is a surface of the external circumference 30, to the inside diameter surface; a smaller diameter surface 35 (smaller diameter part) that perpendicularly extends from the radially extending surface 34 in the axial direction; and a radially extending surface 36 that perpendicularly extends from the smaller diameter surface 35 to the outside diameter surface. The radially extending surface 36 is adjacent to a larger diameter surface 37, which has the same diameter as the larger diameter surface 33. A spool valve part 32 is constituted by a step defined by the larger diameter surface 33, the radially extending surface 34, and the smaller diameter surface 35.

The land 41 is defined by a radially extending surface 44 (radially extending part) that perpendicularly extends from a larger diameter surface 43 (larger diameter part), which is a surface of the internal circumference 40, to the inside diameter surface; a smaller diameter surface 45 (smaller diameter part) that perpendicularly extends from the radially extending surface 44 in the axial direction; and a radially extending surface 46 that perpendicularly extends from the smaller diameter surface 45 toward the outside. The radially extending surface 46 is adjacent to a larger diameter surface 47, which has the same diameter as the larger diameter surface 43. A spool seating part 42 is constituted by a step defined by the larger diameter surface 43, the radially extending surface 44, and the smaller diameter surface 45. Thus, a spool valve structure SP is composed of the spool valve part 32 and the spool seating part 42.

Figure 3:
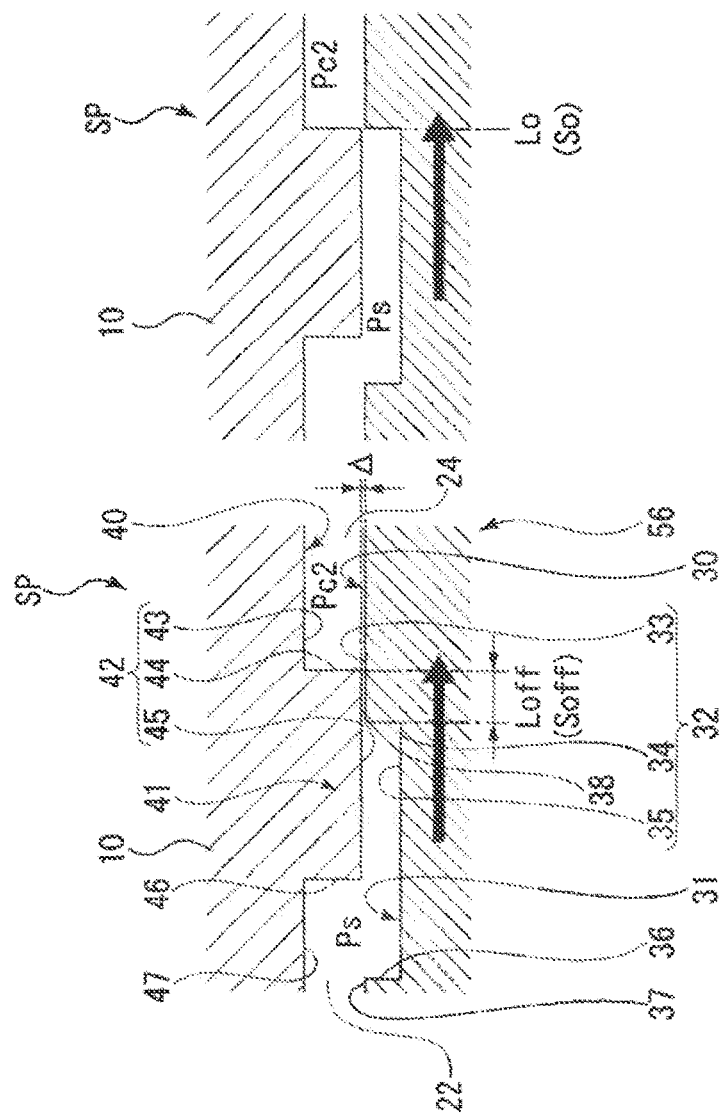
FIG. 3 are an enlarged cross-sectional view of a spool valve structure of the Embodiment 1.

When the solenoid 80 is not energized, the valve body 50 has the minimum stroke Soff, in which the travel length of the valve body 50 is 0 when the element is not energized, and the smaller diameter surface 45 of the spool seating part 42 and the larger diameter surface 33 of the spool valve part 32 are overlapped radially by an axial length Loff, as illustrated in FIG. 3 (a). The axial length of the land 41 may be decreased so that the smaller diameter surface 45 and the larger diameter surface 33 are radially overlapped with each other over the entire axial length.

The smaller diameter surface 45 of the spool seating part 42 and the larger diameter surface 33 of the spool valve part 32 are slightly separated by a radial length A to provide an opening area A1 (see FIG. 5), which functions as a throttle 38 (see FIG. 1 and FIG. 3), so that the control pressure Pc2 and the auction pressure Ps are substantially equalized after a longer period of time. Thus, when the spool valve structure SP is in its closed state, the structure is not fully closed and allows the fluid to leak.

When the solenoid 80 is energized, the valve body 50 is moved. When the valve body 50 moves at its maximum stroke SMAX, the element 50 is in the position illustrated in FIG. 3 (c). In the position, the radially extending surface 34 and the radially extending surface 44 are separated by the axial length LMAX. When the radius between the larger diameter surface 33 and the center of the valve body is designated as r, the opening area A2 is $2\pi r \ast LMax$. FIG. 3 (b) illustrates that the valve body 50 is at the opening stroke position S0, in which the radially extending surface 34 is radially in plane with the radially extending surface 44, and that the axial length L0 is 0, which indicates the opening point.

Now, the operation of the displacement control valve V will be described.

When the solenoid 80 is not energized, the valve body 50 is pressed toward the solenoid 80 by the pressure sensitive member 60, and the second valve part 53 is engaged with the second seating surface 83c to close the communication paths 13a and 13b, which are inlet paths. The first valve part 52 is separated from the first seating surface 12c to open the communication paths 12a and 12b, which are discharge paths. In this case, the valve body 50 has the minimum stroke Soff, and the spool valve part 32 closes the spool seating part 42, as described above (see FIG. 3 (a) and FIG. 5 (a)).

When the coil 87 of the solenoid 80 is de-energized, the displacement control valve V opens the communication paths 12a and 12b, which are discharge paths, thereby flowing the fluid from the discharge chamber 2 through the displacement control valve V into the control chamber 4. This is because the discharge pressure Pd is higher than the control pressure Pc immediately after the coil is de-energized.

As the control pressure Pc increases, the fluid in the control chamber 4 flows into the inlet chamber 3 through the communication path 9 and the fixed orifice 9a (see FIG. 1). Such fluid flow is continued until the discharge pressure Pd, the suction pressure Ps, and the control pressure Pc become balanced. Thus, when the valve is left for a long period of time, the discharge pressure Pd, the suction pressure Ps, and the control pressure Pc are balanced and equalized (the state of Ps>Pc>Pd is changed to the state of Ps=Pc=Pd), and thus the suction pressure Ps and the control pressure Pc are much higher than those exhibited during the continuous operation.

Upon re-activation of the variable displacement compressor M, the control pressure Pc is much higher than that exhibited during the continuous operation, and thus the pistons 8c have a short stroke.

In this case, when the magnetic force generated in the coil 87 exceeds the pressing force of the pressure sensitive member 60 and the coil spring 86, the fixed iron core 83 attracts the movable iron core 85, and then the drive rod 84 and the valve body 50 move toward the pressure sensitive member 60 in the displacement control valve V.

As the valve body 50 moves, the first valve part 52 is engaged with the first seating surface 12c to close the communication paths 12a and 12b, which are discharge paths, and the second valve part 53 is separated from the second seating surface 83c to open the communication paths 13a and 13b, which are inlet paths. In this case, the spool valve part 32 is separated from the spool seating part 42 to open the communication paths 13a and 18a as described above (see FIG. 3 (c)). Thus, the fluid in the control chamber 4 flows through the communication paths 13a and 18a into the inlet chamber 3.

When the valve is left for a long period of time, and then the fluid such as a refrigerant in the control chamber is liquefied, the control pressure Pc may be increased upon re-activation of the variable displacement compressor M. When the control pressure Pc (=Pc1) exceeds a specified level, the bellows 61 contracts, and the third seating surface 70c of the adapter 70 is disengaged from the engagement surface 54c of the third valve part 54. Then, the fluid flows through the second communication path 55 and the communication paths 13a and 13b into the inlet chamber 3. When the control pressure Pc (=Pc1) is less than the specified level, the bellows 61 expands, and the third seating surface 70c of the adapter 70 is engaged with the engagement surface 54c of the third valve part 54 to discommunicate the second communication path 55 from the third valve chamber 23.

Immediately after the variable displacement compressor M is re-activated, the fluid in the control chamber 4 can flow from the third valve part 54, as well as from the spool valve structure SP, into the inlet chamber 3, and thus the control pressure Pc is quickly reduced, so that it takes a shorter time to control the fluid rate to a target value in the variable displacement compressor M.

Figure 4:
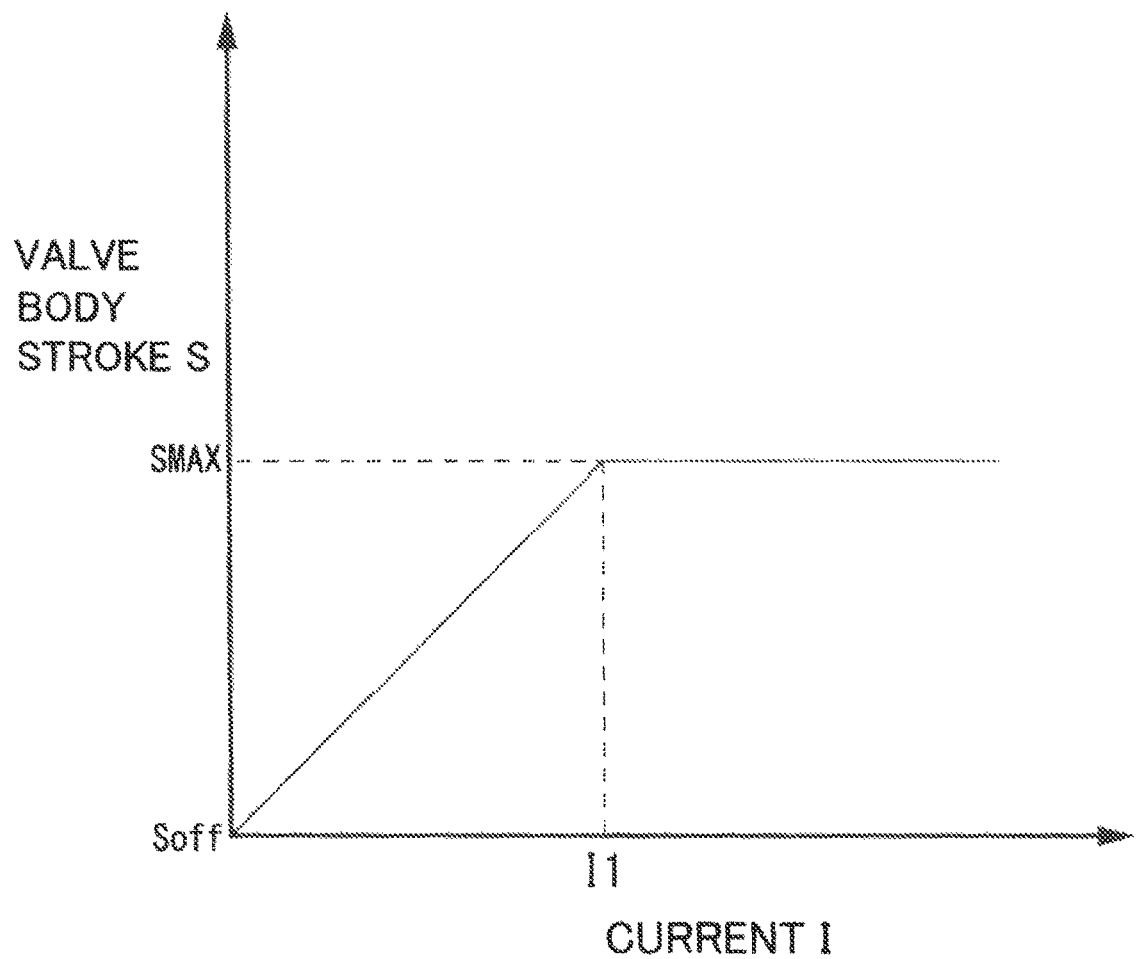
FIG. 4 illustrates the relationship between current I and valve body stroke S in the Embodiment 1.

To achieve the target rate of discharge flow in the variable displacement compressor M during the continuous operation, a current that corresponds to the target rate of discharge flow is supplied to the solenoid 80, as already well known. As illustrated in FIG. 4, the valve body stroke S substantially proportionally increases with increasing current I, from the stroke Soff, at which the valve body 50 has a travel length of 0 when the solenoid 80 is not energized. At current I1, the first valve part 52 becomes engaged with the first seating surface 12c, and the stroke S reaches the maximum stroke SMAX. After that, the stroke does not increase even if the current I increases.

Figure 5:
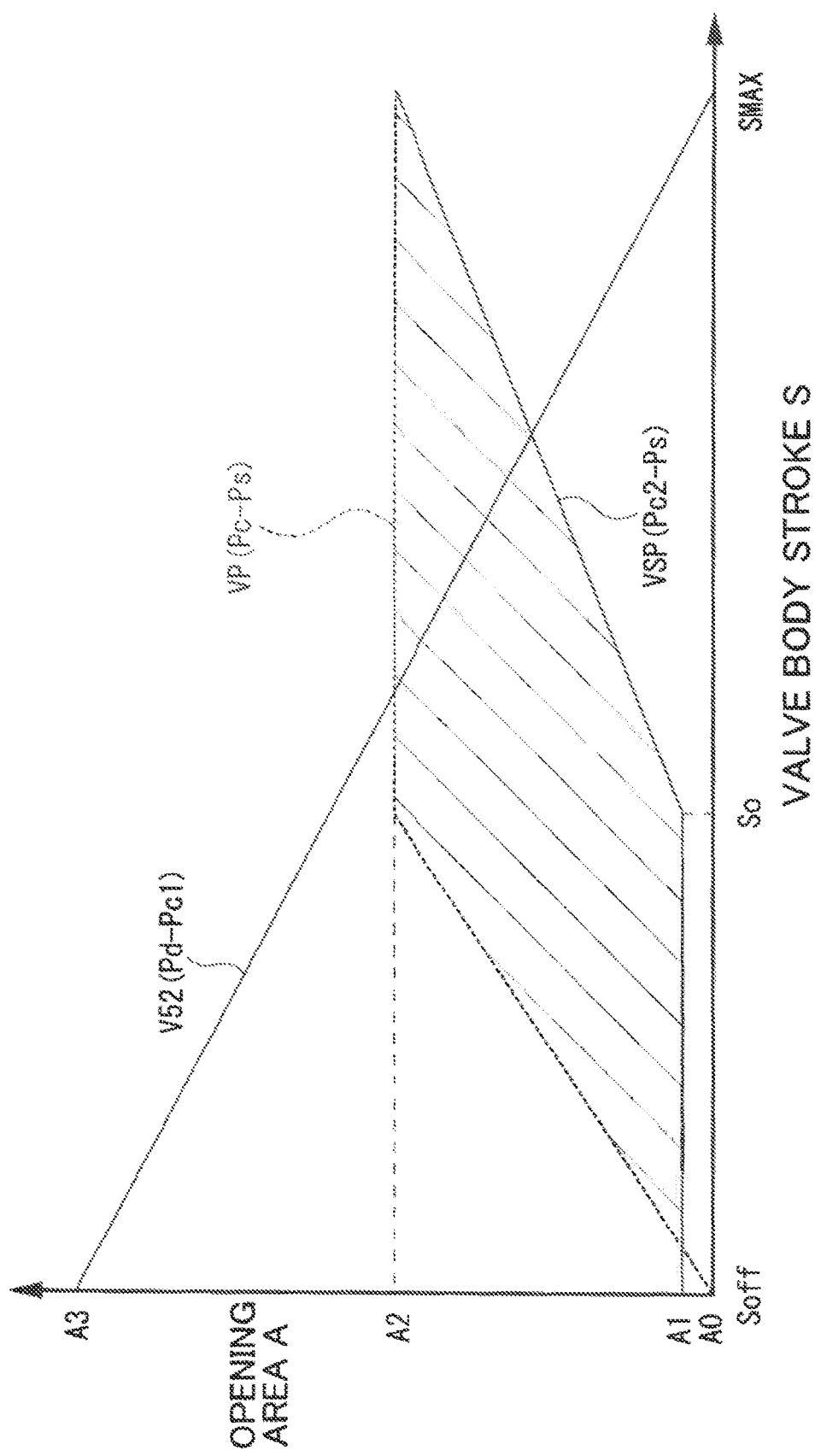
FIG. 5 illustrates the relationship between valve body stroke S and opening area A in the Embodiment 1.

As illustrated in FIG. 5, the opening area V52 between the first valve part 52 and the first seating surface 12c (also referred to as the opening area between Pd and Pc1) proportionally decreases with increasing valve body stroke S, from the maximum opening area A3 to the minimum opening area A0, which is 0. The opening area VSP of the spool valve structure SP (also referred to as the opening area between Pc2 and Ps) is constant at the minimum opening area A1 until the valve body stroke S increases to S0 (until the spool valve becomes as illustrated in FIG. 3 (b)). Then, the opening area VSP proportionally increases to the maximum opening area A2 (the spool valve becomes as illustrated in FIG. 3 (c)).

Thus, after the stroke S exceeds the opening stroke S0, the opening area VSP of the spool valve structure SP increases in contrast with decreasing opening area V52 between the first valve part 52 and the first seating surface 12c.

Figure 11:
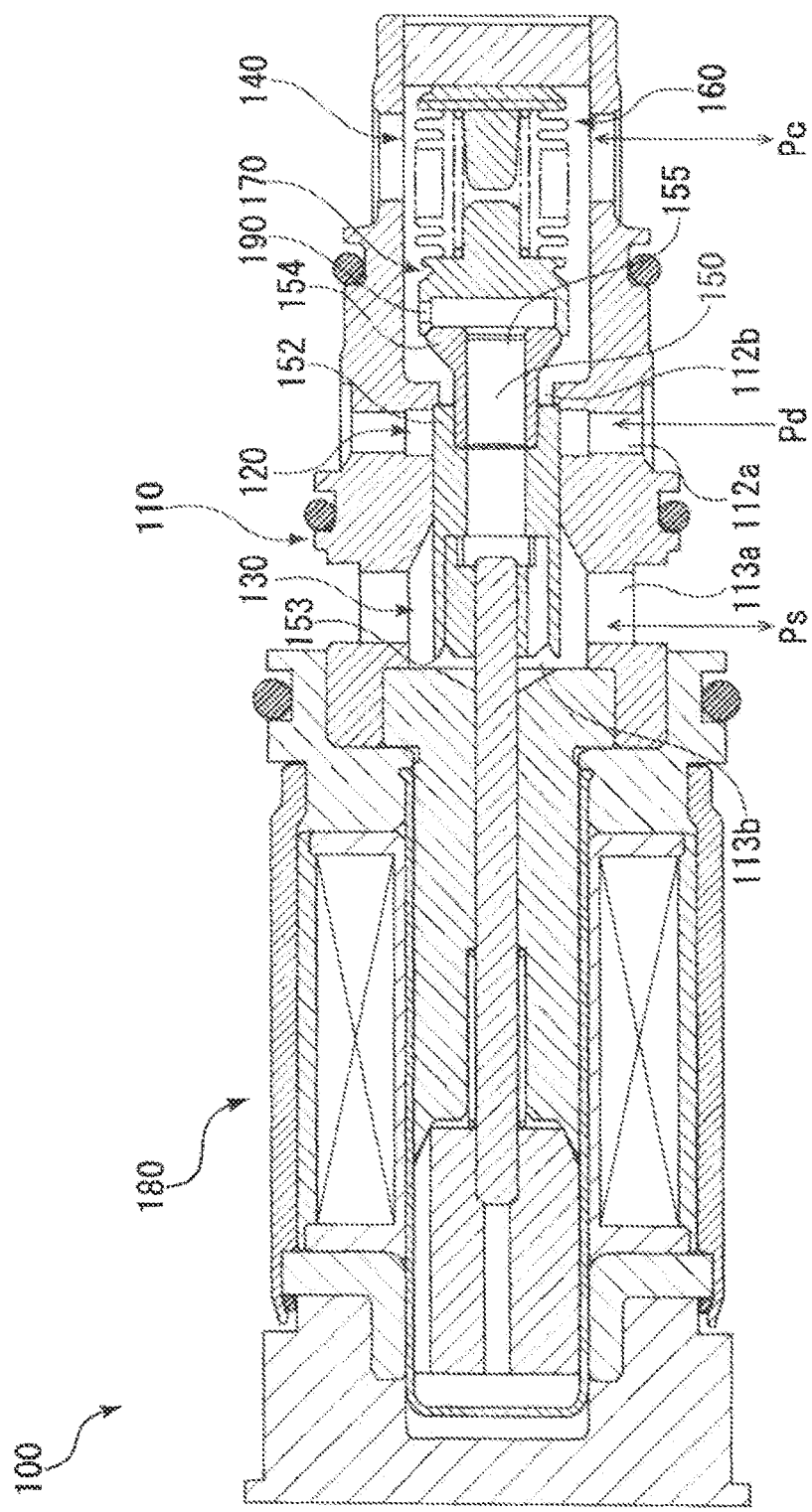
FIG. 11 is a cross-sectional view of a conventional displacement control valve when the solenoid is energized.

As described above, the opening area VSP of the spool valve structure SP increases in contrast with decreasing opening area V52 of the first valve part 52 in response to the movement of the valve body 50, and thus the displacement control valve V simultaneously controls the rate of flow between the discharge chamber 2 and the control chamber 4 and the rate of flow between the inlet chamber 3 and the control chamber 4. Then, the rate of flow from the control chamber 4 into the inlet chamber 3 is restricted during the continuous operation of the variable displacement compressor M, so that the operational efficiency of the variable displacement compressor M can be improved. Although the opening area of the conventional first valve part of FIG. 11 is similar to that in the Embodiment 1, the auxiliary communication path 190 has a constant opening area, and thus the opening area VP of the auxiliary communication path 190 in response to the valve body stroke S is larger than the opening area V52 of the first valve part 52 in the Embodiment 1. In the Embodiment 1, fluid flow into the inlet chamber 3 is decreased by the shaded area in FIG. 5, compared with the conventional art, so that the operational efficiency of the variable displacement compressor M can be improved.

In the Embodiment 1, as the spool valve structure SP is disposed between the inlet chamber 3 and the control chamber 4, the flow rate can be precisely controlled.

In addition, the spool valve structure SP is constituted by the internal circumference 40 of the valve housing 10 and the external circumference 30 of the valve body 50, and thus the radius r, which is the radial distance from the center of the valve body 50 to the spool valve part 32, can be increased, so that the circumferential length of the spool valve structure SP and the opening area VSP of the spool valve structure SP can be increased. Thus, the flow rate can be precisely controlled. In addition, the spool valve structure SP is constituted by the internal circumference 40 of the valve housing 10 itself and the external circumference 30 of the valve body 50 itself (in other words, an additional annular ring and the like are not used), and thus the valve housing 10 can be have a simple structure and a small outside diameter.

In addition, when the radial length of the radially extending surface 34, which is the depth of the concave groove 31, is similar to the radial length of the radially extending surface 44, which is the height of the land 41, and specifically, is in the range of from ⅕ to 5 times and preferably from ½ to 2 times, an adequate flow rate can be achieved in the state illustrated in FIG. 5 (c), and the main valve body 56 and the valve housing 10 do not become radially larger than necessary. Thus the size of the displacement control valve V can be reduced.

The spool valve structure SP is formed by the concave groove 31 and the land 41 and thus can have a simple structure.

In addition, the concave groove 31 is provided, and at both axial ends of the concave groove 31, the larger diameter surface 33 and the larger diameter surface 37 are formed. And the second valve part 53 is formed on the side of the larger diameter surface 37 toward the solenoid 80. As the larger diameter surface 37 is disposed outwardly of the smaller diameter surface 35, the second valve part 53 can be disposed away from the central axis.

Figure 8A:
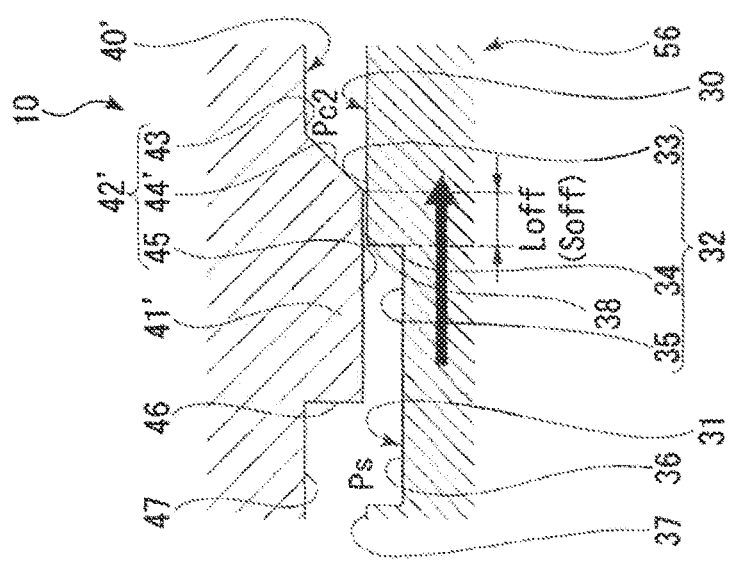
FIG. 8(a) is an enlarged cross-sectional view in a closed state in which the valve is not energized.
Figure 8B:
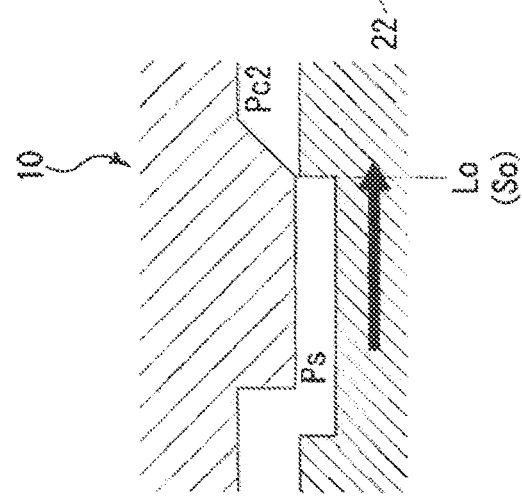
FIG. 8(b) is an enlarged cross-sectional view at an opening point in which the valve is not energized.
Figure 8C:
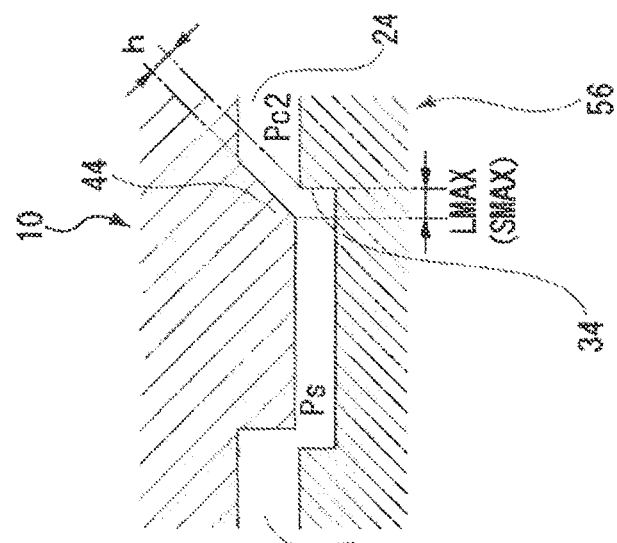
FIG. 8(c) is an enlarged cross-sectional view in a state in which the coil is energized and in which the opening area is largest.

The radially extending surface 44 of the spool seating part 42 is perpendicular to the smaller diameter surface 45 and the larger diameter surface 43, and thus when the valve body stroke S exceeds the opening point (FIG. 5 (b)), the opening area becomes large (for example, the opening area becomes larger in response to the valve body stroke S, compared with the case in which the radially extending surface 44 is slanted with respect to a radial direction as illustrated in FIG. 8 described below. In particular, the dimensional relationship is LMAX>h in FIG. 8, in which h is the minimum length between the slanted radially extending surface 44' and a corner part of the main valve body 56 facing to the slanted radially extending surface 44'). Thus, even when the travel length of the valve body 50 is short, the flow in the spool valve structure SP can be provided, so that the flow rate can be controlled quickly.

The radially extending surface 34 of the spool valve part 32 is perpendicular to the smaller diameter surface 35 and the larger diameter surface 33, and thus when the valve body stroke S exceeds the opening point, the opening area becomes large. Thus, even when the travel length of the valve body 50 is short, the flow in the spool valve structure SP can be provided, so that the flow can be controlled quickly.

The smaller diameter surface 45 of the spool seating part 42 and the larger diameter surface 33 of the spool valve part 32 are configured to be radially overlapped with each other, when the solenoid 80 is not energized. Thus, even if the travel length of the valve body 50 is slightly changed due to aging and the like, the spool valve structure SP can reliably provide the closed state. In Embodiment 1, the valve is not fully closed in the closed state, and the aperture 38 is formed by the gap A.

The aperture 38 allows the fourth valve chamber 24 to have the substantially same pressure as the second valve chamber 22 when the displacement control valve is not used, and thus the valve body 50 can be smoothly moved when the solenoid 80 begins to be energized.

As the fourth valve chamber 24, in which the spool valve structure SP is disposed, is disposed between the first valve chamber 21 and the second valve chamber 22, the displacement control valve V can have a simple structure.

As the displacement control valve V has an external path that allows the fourth valve chamber 24 and the third valve chamber 23 to communicate with the control chamber 4, the valve can have a large flow area and easily permit the fluid to flow in or out of the chambers.

Embodiment 2

Figure 6:
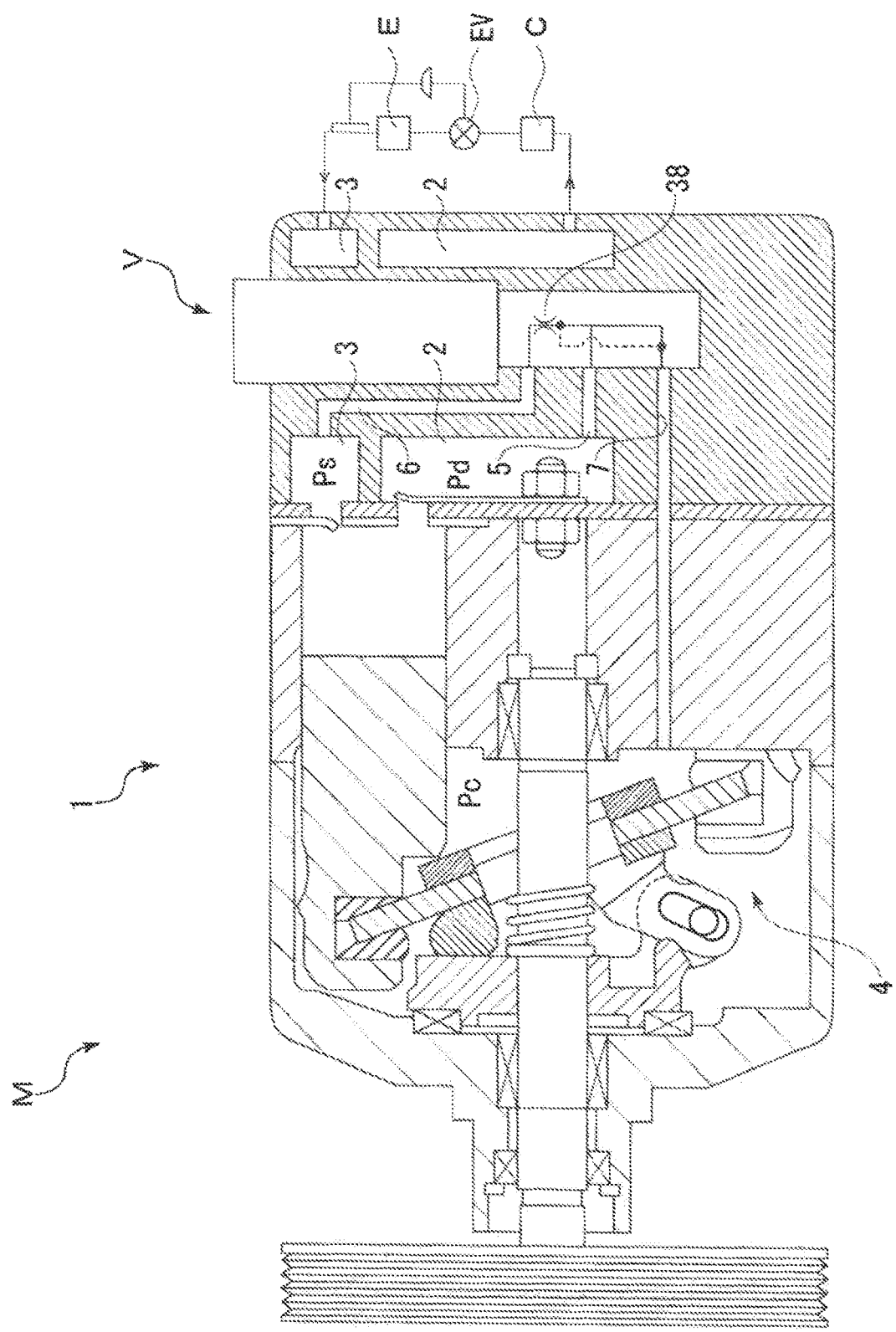
FIG. 6 is a schematic diagram of a swashplate type variable displacement compressor with a displacement control valve according to an Embodiment 2 of the present invention.

Now, the Embodiment 2 will be described. Except that the communication path 9 and the fixed orifice 9a are eliminated as illustrated in FIG. 6, the Embodiment 2 has the same configuration as Embodiment 1, and thus the description is omitted.

The displacement control valve V includes a throttle 38 that allows a second valve chamber 22 to communicate with a fourth valve chamber 24 so that the fluid can flow between the second valve chamber 22 and the fourth valve chamber 24 when a solenoid 80 is not energized. Thus the valve can have a simple structure.

Embodiment 3

Figure 7:
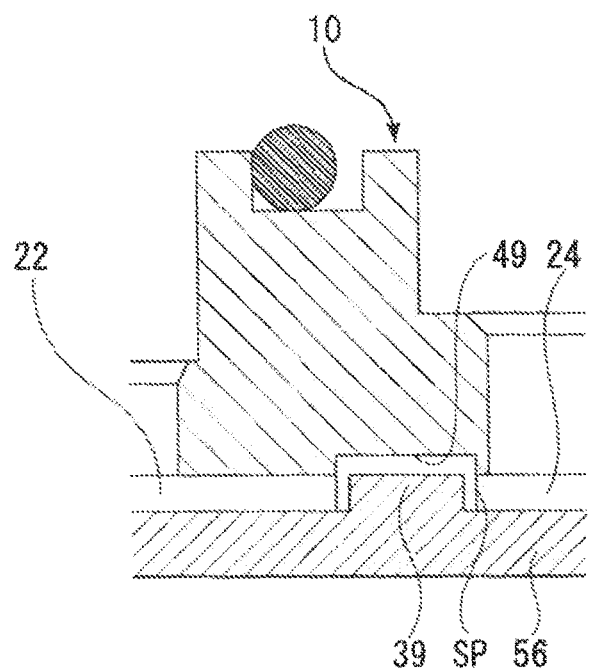
FIG. 7 is an enlarged cross-sectional view of a spool valve structure of a displacement control valve according to an Embodiment 3 of the present invention.

Now, the Embodiment 3 will be described. Except that a main valve body 56 includes a land 39, and a valve housing 10 includes a groove 49 as illustrated in FIG. 7, the Embodiment 3 has the same configuration as Embodiment 1, and thus the description is omitted.

As the groove 49 is provided in the valve housing 10 on the outer side, the radial length between the central axis and the groove 49 is increased, so that the axial length of the groove 49 is increased and that the spool valve structure SP can have a large opening area. Accordingly, the displacement control valve V can have a short axial length.

Embodiment 4

Now, the Embodiment 4 will be described. Except that a land 41' has a substantially trapezoidal cross section as illustrated in FIG. 8, the Embodiment 4 has the same configuration as Embodiment 1, and thus the description is omitted.

The land 41' is defined by a slanted radially extending surface 44' (radially extending part) that is slanted at about 45 degrees to a larger diameter surface 43 and that extends toward the inside, a smaller diameter surface 45 that extends from the slanted radially extending surface 44' and on the inside of a larger diameter surface 43 in the axial direction, and a radially extending surface 46 that perpendicularly extends from the smaller diameter surface 45 in the outward direction. A spool seating part 42' is constituted by a step defined by the larger diameter surface 43, the slanted radially extending surface 44', and the smaller diameter surface 45. The slanted radially extending surface 44' allows for smooth fluid flow between the fourth valve chamber 24 and the second valve chamber 22. A radially extending surface 34 of a concave groove 31 may also be sloped.

Embodiment 5

Now, the Embodiment 5 will be described. As illustrated in FIG. 3, the spool valve structure SP provides the maximum opening area A2 when the valve body has the maximum stroke SMAX, ant thus it is preferred to control the current supplied to the solenoid 80 upon re-activation, in the manner described below.

Figure 9:
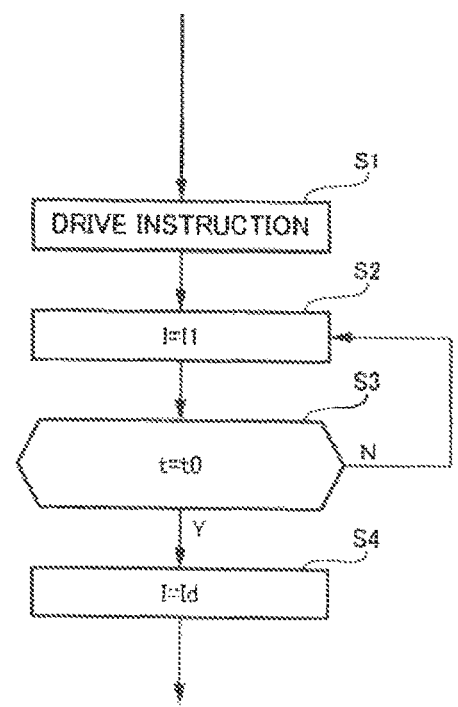
FIG. 9 is a flowchart illustrating control upon activation of the displacement control valve according to an Embodiment 5 of the present invention.

With reference to FIG. 9, when a control circuit (not shown) in the displacement control valve V receives a drive instruction by drive current of target current Id (S1), the solenoid 80 is driven by current I1 (S2). After a specified period of time t0 (S3), the current is controlled to the target current Id. As used herein, the current I1 is a current when the valve body has the maximum stroke SMAX (see FIG. 4). The current I may be equal to or higher than the current I1, and preferably is equal to the current I1 from the viewpoint of power consumption. The specified period of time to is a period for which the control pressure Pc in the control chamber 4 becomes less than a specified value, and the period of time to may be previously specified.

Upon re-activation, the current I1 is supplied to the solenoid 80 for a specified period of time before the target current Id is supplied, and thus the fluid can be flowed with the opening area A2 being largest. Even if the compressor stops for a long period of time, the control pressure Pc in the control chamber 4 can be quickly reduced.

Embodiment 6

Figure 10:
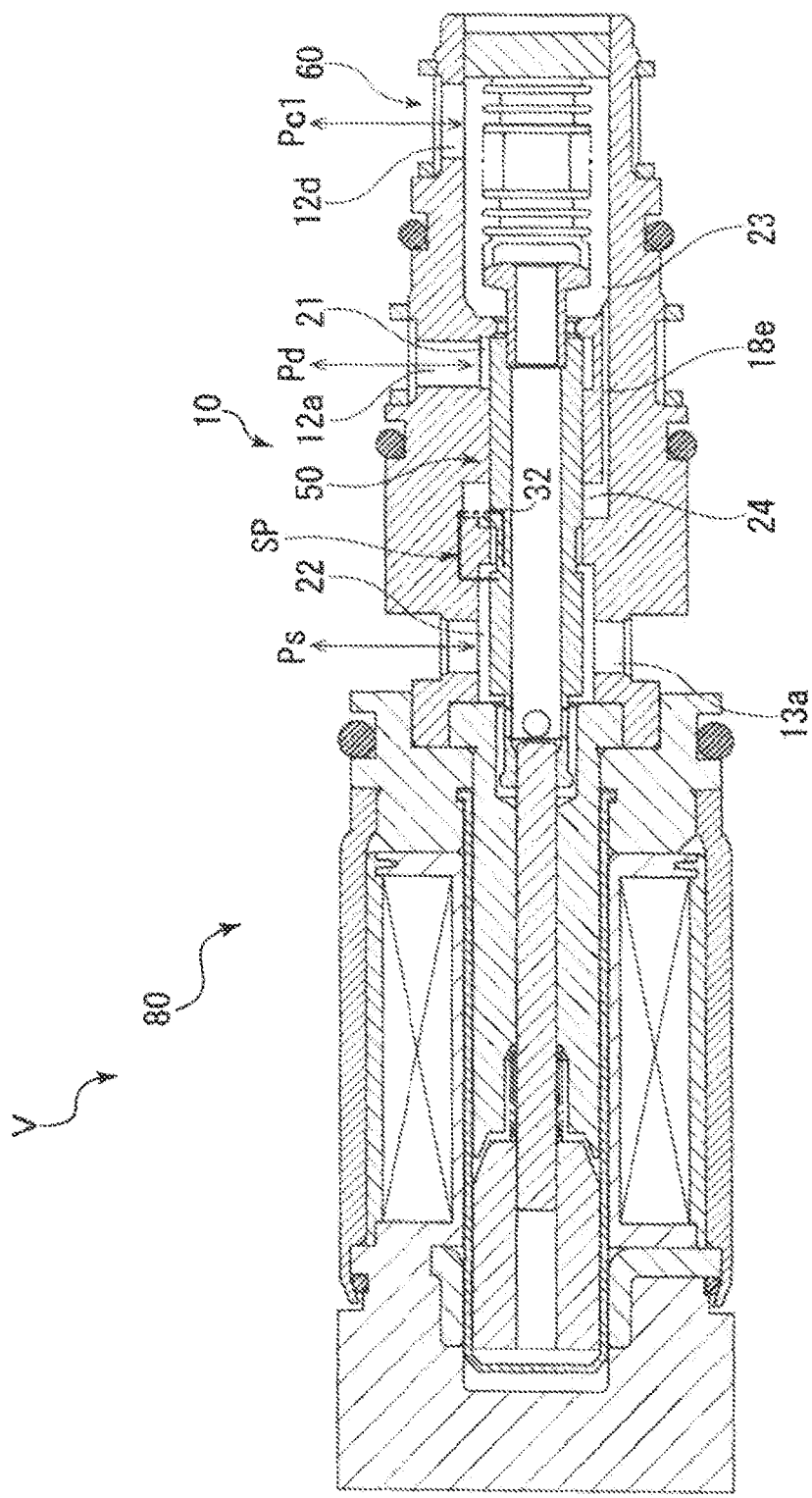
FIG. 10 is a cross-sectional view of a displacement control valve according to an Embodiment 6 of the present invention when the solenoid is energized.

Now, the Embodiment 6 will be described. Except that the Embodiment 6 includes a communication path 18e that allows for axial communication in the valve housing 10, as illustrated in FIG. 10, in place of the communication path 18a that allows the valve housing 10 to radially communicate with the inside and the outside, Embodiment 6 has the same configuration as Embodiment 1, and thus the description is omitted. Obviously, Embodiment 6 may have the configuration of the Embodiments 2-5.

As illustrated in FIG. 10, the valve housing 10 includes a communication path 18e as a through hole that allows a fourth valve chamber 24 to communicate with a third valve chamber 23 and that extends in the axial direction. The communication path 18e does not communicate with a communication path 12a that is disposed axially between the fourth valve chamber 24 and the third valve chamber 23. Such configuration allows a control pressure Pc1 to act on the fourth valve chamber 24 via the communication path 18e. The valve housing 10 includes the smaller number (compared with the Embodiment 1) of communication paths 12a, 12d, and 13a that communicate with the radial interior and exterior and that have a port leading to the outside, and the number of O rings on the external circumference of the valve housing 10 can be decreased. Thus, the valve housing 10 can be configured to have a shorter axial length and can easily maintain coaxiality with the valve body 50 and the spool valve part 32, so that the valve body 50 and the spool valve part 32 have good operability.

Although Embodiments of the present invention have been described with reference to the drawings, specific configurations are not limited to Embodiments, and any modifications and additions without departing from the spirit of the present invention are encompassed by the present invention.

Although we have described the second seating surface 83c, which is engaged with the second valve part 53, as being formed at an end of the fixed iron core 83 that closes an end of the valve housing 10, the location is not limited thereto, and the second seating surface 83c may be formed at another location.

Although we have described the spool valve structure SP as being formed by a land and a concave groove, at least one of them may only be a step formed by a larger diameter part, a smaller diameter part, and a radially extending part. Moreover, in FIG. 3 and the like, when the distance between the radially extending surface 34 and the radially extending surface 44 is maximum, the distance between the radially extending surface 34 and the radially extending surface 44 has been described as being the same or more than the distance between the radially extending surface 36 and the radially extending surface 46, but when the distance between the radially extending surface 34 and the radially extending surface 44 is maximum, the distance between the radially extending surface 34 and the radially extending surface 44 may be formed larger than the distance between the radially extending surface 36 and the radially extending surface 46.

Although we have described the communication paths 12a, 12d, 13a, and 18a as being formed equally on both sides of the valve housing 10 in the Embodiment 1, these paths are not limited thereto, and the paths may be formed in a single amount on one same side of the valve housing 10, or may be formed in a plural amount in the circumferential direction of the valve housing 10, provided that the structural strength is not exceeded. This also applies to the communication paths 12a, 12d, and 13a in the Embodiment 6.

Although we have described the valve body 50 as including the second communication path 55, the valve body 50 is not limited thereto, and the valve body 50 may be solid.

REFERENCE SIGNS LIST

2 Discharge chamber
3 Inlet chamber
4 Control chamber
10 Valve housing
12a Communication path
12b Communication path
12c First seating surface
12d Communication path
13a Communication path
13b Communication path
18a Communication path
18e Communication path
21 First valve chamber (first chamber, on which the discharge pressure Pd acts)
22 Second valve chamber (second chamber, on which the suction pressure Ps acts)
23 Third valve chamber (third chamber, on which the control pressure Pc1 acts)
24 Fourth valve chamber (fourth chamber, on which the control pressure Pc2 acts)
30 External circumference
31 Concave groove
32 Spool valve part
33 Larger diameter surface (larger diameter part)
34 Radially extending surface (radially extending part)
35 Smaller diameter surface (smaller diameter part)
38 Aperture
39 Land
40 Internal circumference
41 Land
41' Land
42 Spool seating part
42' Spool seating part
43 Larger diameter surface (larger diameter part)
44 Radially extending surface (radially extending part)
44' Slanted radially extending surface (radially extending part)
45 Smaller diameter surface (smaller diameter part)
49 Groove
50 Valve body
52 First valve part
53 Second valve part
54 Third valve part
54c Engagement surface
70c Third seating surface
80 Solenoid
83c Second seating surface
83d Flange A Opening area
M Variable displacement compressor
Pc Control pressure
Pc1 Control pressure
Pc2 Control pressure
Pd Discharge pressure
Ps Suction pressure
S Valve body stroke
V Displacement control valve
V52 Opening area (opening area of the first valve part 52)
VSP Opening area (opening area of the spool valve structure SP)
Δ Gap

The invention claimed is:

1. A displacement control valve comprising:
a valve housing including a first chamber formed between discharge paths that allow a discharge chamber for discharging fluid to communicate with a control chamber for controlling a volume of the discharged fluid, a second chamber formed between inlet paths that allow an inlet chamber for sucking the fluid to communicate with the control chamber, and a third chamber opposed to the second chamber across the first chamber;
a valve body that has a first valve part for opening or closing the discharge paths in the first chamber and that is reciprocated to open or close the discharge paths; and
a solenoid configured to apply electromagnetic force to the valve body in the direction that closes the first valve part,
wherein the displacement control valve has a spool valve structure that comprises a spool valve part formed on an external circumference of the valve body and a spool seating part formed on an internal circumference of the valve housing and that is opened while the first valve part is closed and vice versa upon reciprocation of the valve body to control the rate of flow between the control chamber and the inlet chamber,
the valve body further includes communication path that is formed inside the valve body and partially forms the inlet paths such that the communication path extends from the third chamber to the second chamber,
the first valve part is formed on a first end side of the valve body, and the valve body further has a second valve part formed on a second end side of the valve body and configured to open and close the inlet paths in the second chamber, the first end side and the second end side being opposed to each other in an axial direction of the valve body.

2. The displacement control valve according to claim 1, wherein the spool seating part comprises a step formed on the internal circumference of the valve housing by a larger diameter part, a smaller diameter part and a radially extending part connecting the larger diameter part to the smaller diameter part, and that the spool valve part comprises a step formed on the external circumference of the valve body by a smaller diameter part, a larger diameter part and a radially extending part connecting the larger diameter part to the smaller diameter part.

3. The displacement control valve according to claim 2, wherein the radially extending part of the spool valve part is perpendicular to the smaller diameter part and the larger diameter part of the spool valve part.

4. The displacement control valve according to claim 2, wherein the radially extending part of the spool seating part is perpendicular to the smaller diameter part and the larger diameter part of the spool seating part.

5. The displacement control valve according to claim 1, wherein the smaller diameter part of the spool seating part and the larger diameter part of the spool valve part are configured to be radially overlapped with each other when the solenoid is not energized.

6. The displacement control valve according to claim 1, wherein the spool valve structure forms a throttle between the control chamber and the inlet chamber when the solenoid is not energized.

7. The displacement control valve according to claim 1, further comprising a fourth chamber in which the spool valve structure is disposed is provided between the first chamber and the second chamber.

8. The displacement control valve according to claim 7, wherein the valve housing includes a through hole configured to allow the third chamber to communicate with the control chamber and a through hole configured to allow the fourth chamber to communicate with the control chamber and that the third chamber are separated from the fourth chamber.

9. The displacement control valve according to claim 7, wherein the valve housing includes a through hole configured to allow the third chamber to communicate with the control chamber and a through hole configured to allow the fourth chamber to communicate with the third chamber in the valve housing.

10. The displacement control valve according to claim 2, wherein a fourth chamber in which the spool valve structure is disposed is provided between the first chamber and the second chamber.

11. The displacement control valve according to claim 10, wherein the valve housing includes (a) a through hole configured to allow the third chamber to communicate with the control chamber and a through hole configured to allow the fourth chamber to communicate with the control chamber and that the third chamber are separated from the fourth chamber, or (b) a through hole configured to allow the third chamber to communicate with the control chamber and a through hole configured to allow the fourth chamber to communicate with the third chamber in the valve housing.

12. The displacement control valve according to claim 3, wherein a fourth chamber in which the spool valve structure is disposed is provided between the first chamber and the second chamber.

13. The displacement control valve according to claim 12, wherein the valve housing includes (a) a through hole configured to allow the third chamber to communicate with the control chamber and a through hole configured to allow the fourth chamber to communicate with the control chamber and that the third chamber are separated from the fourth chamber, or (b) a through hole configured to allow the third chamber to communicate with the control chamber and a through hole configured to allow the fourth chamber to communicate with the third chamber in the valve housing.

14. The displacement control valve according to claim 4, wherein a fourth chamber in which the spool valve structure is disposed is provided between the first chamber and the second chamber.

15. The displacement control valve according to claim 14, wherein the valve housing includes (a) a through hole configured to allow the third chamber to communicate with the control chamber and a through hole configured to allow the fourth chamber to communicate with the control chamber and that the third chamber are separated from the fourth chamber, or (b) a through hole configured to allow the third chamber to communicate with the control chamber and a through hole configured to allow the fourth chamber to communicate with the third chamber in the valve housing.

16. The displacement control valve according to claim 5, wherein a fourth chamber in which the spool valve structure is disposed is provided between the first chamber and the second chamber.

17. The displacement control valve according to claim 16, wherein the valve housing includes (a) a through hole configured to allow the third chamber to communicate with the control chamber and a through hole configured to allow the fourth chamber to communicate with the control chamber and that the third chamber are separated from the fourth chamber, or (b) a through hole configured to allow the third chamber to communicate with the control chamber and a through hole configured to allow the fourth chamber to communicate with the third chamber in the valve housing.

18. The displacement control valve according to claim 6, wherein a fourth chamber in which the spool valve structure is disposed is provided between the first chamber and the second chamber.

19. The displacement control valve according to claim 18, wherein the valve housing includes (a) a through hole configured to allow the third chamber to communicate with the control chamber and a through hole configured to allow the fourth chamber to communicate with the control chamber and that the third chamber are separated from the fourth chamber, or (b) a through hole configured to allow the third chamber to communicate with the control chamber and a through hole configured to allow the fourth chamber to communicate with the third chamber in the valve housing.

* * * * *